(12) United States Patent
Van Den Steen

(10) Patent No.: US 9,044,966 B2
(45) Date of Patent: Jun. 2, 2015

(54) METHOD OF PRODUCING WALL COVERING WITH RELIEF IN A CONTINUOUS PROCESS

(75) Inventor: Joris Martha Alfons Van Den Steen, Bever (BE)

(73) Assignee: FLOORING INDUSTRIES LIMITD, SARL, Bertrange (LU)

( * ) Notice: Subject to any disclaimer, the term of this patent is extended or adjusted under 35 U.S.C. 154(b) by 0 days.

(21) Appl. No.: 14/008,662

(22) PCT Filed: Mar. 19, 2012

(86) PCT No.: PCT/IB2012/000540
§ 371 (c)(1),
(2), (4) Date: Sep. 30, 2013

(87) PCT Pub. No.: WO2013/050815
PCT Pub. Date: Apr. 11, 2013

(65) Prior Publication Data
US 2014/0022291 A1    Jan. 23, 2014

(30) Foreign Application Priority Data
Apr. 1, 2011 (BE) .................................... 2011/0198

(51) Int. Cl.
| | | |
|---|---|---|
| B41J 2/01 | (2006.01) |
| B41J 3/44 | (2006.01) |
| B41M 3/18 | (2006.01) |
| D06N 7/00 | (2006.01) |
| D21H 25/06 | (2006.01) |
| D21H 27/02 | (2006.01) |
| D21H 27/20 | (2006.01) |
| D21H 19/20 | (2006.01) |
| B41M 5/00 | (2006.01) |
| E04F 13/00 | (2006.01) |

(52) U.S. Cl.
CPC . *B41J 3/445* (2013.01); *B41M 3/18* (2013.01); *B41M 5/0047* (2013.01); *D06N 7/0002* (2013.01); *E04F 13/002* (2013.01); *D21H 25/06* (2013.01); *D21H 27/02* (2013.01); *D21H 27/20* (2013.01); *D21H 19/20* (2013.01); *B42D 2035/34* (2013.01)

(58) Field of Classification Search
CPC ........................................................ B41M 3/18
See application file for complete search history.

(56) References Cited

U.S. PATENT DOCUMENTS

| | | | |
|---|---|---|---|
| 4,279,954 A * | 7/1981 | Johnard | ........................ 428/158 |
| 5,712,018 A | 1/1998 | Frisch | |
| 6,409,333 B1 | 6/2002 | Nishikawa | |

FOREIGN PATENT DOCUMENTS

JP    10309764 A    11/1998

OTHER PUBLICATIONS

International Search Report (ISR) for PCT/IB2012/000540 dated May 8, 2012.

*Primary Examiner* — Julian Huffman
(74) *Attorney, Agent, or Firm* — Bacon & Thomas, PLLC

(57) ABSTRACT

The present invention relates to a method for producing wall covering with relief, such as for example wallpaper, in a continuous process in a less expensive way (in the case of limited print runs) and with fewer limitations with regard to the size of the repeat of the pattern, comprising: step a providing a base; step b applying a heat-expandable material to this base in a continuous process using an analogue printing technique; step c applying one or more liquids, which influence the expansion of the expandable material, in a desired pattern in a continuous process using a digital printing technique; step d heating the base with the expandable material which has been applied thereto and the one or more liquids applied thereto to a temperature at which the expandable material expands.

11 Claims, 1 Drawing Sheet

METHOD OF PRODUCING WALL COVERING WITH RELIEF IN A CONTINUOUS PROCESS

BACKGROUND OF THE INVENTION

1. Field of the Invention

The present invention relates to a method for producing wall covering with relief, such as for example wallpaper, comprising:
- step a providing a base;
- step b applying a heat-expandable material to this base in a continuous process using an analogue printing technique;
- step c applying one or more liquids, which influence the expansion of the expandable material, in a desired pattern, in a continuous process onto the base onto which the expandable material has been applied;
- step d heating the base with the expandable material which has been applied thereto and the one or more liquids applied thereto to a temperature at which the expandable material expands.

In this context, the expression wall covering with relief is understood to mean that the surface of this wall covering comprises at least two heights or thicknesses which differ from those which the base originally comprised. In this case, such a relief may cover the entire surface of the base or only part thereof.

Such a wall covering may, for example, be wallpaper or, for example, a reproduction of a painting, etc.

It is possible to use a plurality of bases to obtain such a wall covering, such as for example bases in paper, fabrics, non-woven, plastic, cardboard, etc. These bases may optionally be provided with one or more finishing layers before the relief is applied and may also be provided with one or more finishing layers after the relief has been applied. These finishing layers may, for example, comprise colour and relief.

The expandable materials which can be used for this purpose are also generally used and well-known in the wallpaper and wall covering industry.

This may, for example, comprise a so-called PVC paste, containing, for example:
- polyvinyl chloride (PVC) and/or variants, such as for example polyvinylidene chloride, polyvinyl acetate, polyacrylate, polymethacrylate, etc.

supplemented by one or more:
- softeners, such as for example phthalates, or environmentally friendly alternatives, etc.
- and/or fillers, such as for example calcium, etc.
- and/or diluents;
- and/or stabilizers,
- and/or blowing agents, such as for example azodicarbonamide, azoisobutyronitrile, benzene, sulfohydrazide, sodium bicarbonate, etc.
- and/or catalysts;
- and/or accelerators.

2. Related Art

The liquids which influence the expansion of the expandable material may be liquids which promote expansion of this expandable material and/or liquids which hinder or prevent expansion of the expandable material, such as are known in the wallpaper and wall covering industry, inter alia for example as described in U.S. Pat. No. 5,712,018 A.

The known techniques by means of which such a wall covering with relief is formed in a continuous process are usually relatively expensive when limited print runs are being produced. In applications, such as for example with wallpaper, where relief is applied in a continuous process using rotating cylinders, the known methods have the additional drawback that the pattern which is applied to the base in relief, is limited due to the repeat which is inherent to the continuous process.

With wallpaper, it is for example possible to create a relief by applying a material on a support or base. When a certain shape or design is adhered to during the application of this material, the resulting relief will assume this shape or design or adhere thereto. In addition, it is possible to vary the height of the pattern by applying different amounts of material to the base at different locations or by applying materials of different composition and with different expansion properties alternately using different cylinders in a continuous process. In this way, it is possible to apply a decoration which uses three dimensions (length, width and height).

Using current continuous production methods for applying relief to wallpaper, this relief is applied by means of mechanical embossing, chemical embossing or screen printing techniques.

In the case of mechanical embossing, a layer of (optionally coloured) PVC paste is first applied to a base as expandable material, after which it is heated in order to cause the PVC paste to expand in the subsequent step in the production process. Then, the desired relief is embossed onto this layer of PVC paste using one cylinder or a combination of two cylinders on which the desired relief has been applied in positive and/or negative. If it is desired to produce coloured wallpaper, the base has to be printed with additional colouring inks before or after embossing.

In the case of chemical embossing, a layer of (optionally coloured) PVC paste is first applied to a base as expandable material. At a later stage of the production process, this is then printed with liquids which influence the expansion of the expandable material using analogue printing techniques in a continuous process. This may be liquids which promote expansion of this expandable material and/or liquids which hinder or prevent expansion of the expandable material. Subsequently, the PVC paste is heated, as a result of which it expands. At the locations where this paste has been printed with liquids which promote and/or hinder or prevent the expansion, this paste will expand to a greater or lesser degree, respectively, than in the locations where this paste is not printed. Wallpaper which has been produced in such a manner is also known as scope wallpaper.

In the case of screen-printing techniques, a relief-defining liquid (usually expandable PVC paste) is applied to a base by means of a cylinder in which openings have been made according to the desired relief pattern. Subsequently, the base is heated in an oven in order to cause the PVC paste to expand, resulting in the desired relief. If it is desired to produce coloured wallpaper, different printing cylinders may be used in which case a different colour of PVC paste is applied to the base by each cylinder. With the current installations, the number of colours which can be applied is thus usually limited to a maximum of 12 colours. If more (variations in) colours are desired, it is possible, if desired, to print this wallpaper with coloured inks beforehand or in a subsequent step.

With mechanical embossing and chemical embossing as well as with screen-printing techniques in a continuous process, the intended pattern which is applied in relief is limited by the repeat of said cylinders by means of which the relief is either impressed or applied using PVC paste. If it is desired to apply an additional pattern to the support, a second printing cylinder has to be used or a second identical treatment with another printing cylinder has to be repeated.

All these techniques typically are also accompanied by a loss of material during the starting up of a machine in which, inter alia, the different cylinders have to be brought in line with one another so that they run synchronously.

SUMMARY OF THE INVENTION

It is therefore an object of the present invention to provide a method by means of which it is possible to apply a relief to a base in a continuous process in a more inexpensive way (in the case of limited print runs) and with fewer limitations with regard to the size of the repeat of the pattern.

This object of the invention is achieved by providing a method for producing a wall covering with relief, such as for example wallpaper, comprising:
  step a providing a base;
  step b applying a heat-expandable material to this base in a continuous process using an analogue printing technique;
  step c applying one or more liquids, which influence the expansion of the expandable material, in a desired pattern in a continuous process onto the base onto which the expandable material has been applied using a digital printing technique;
  step d heating the base with the expandable material which has been applied thereto and the one or more liquids applied thereto to a temperature at which the expandable material expands.

Instead of using a printing cylinder, it is now possible to use digital printing techniques to apply liquids to a base which has been provided with an expandable material, with these liquids either promoting the expansion of the expandable material on the base or hindering or preventing the expansion of the expandable material on the base. These liquids then also ensure that this expandable material expands in such a manner that the desired relief is produced.

If it is desired to apply several of these liquids to the base, then several liquids can be applied simultaneously or they can be applied successively to the base or a number of them can be applied simultaneously in each case in different stages.

Thus, digital printing techniques offer virtually unlimited possibilities to produce wall covering with relief in a continuous process. In this way, it is possible to apply patterns in relief which are no longer limited by the dimensions of a printing cylinder. In addition, the digital printing technique also offers the significant advantage with regard to relief that it is possible to change the design or pattern of the relief frequently without this resulting in long production standstills and without additional costs having to be made with regard to the device (new printing cylinders). This technique then makes it possible to provide a relief, for example, which is different for each so-called strip (the size of which corresponds to the height of an average room) in one wallpaper roll. When the different strips are subsequently applied to the wall next to one another, it is possible to create a pattern in the relief which exceeds the width of one single strip and extends across various strips. The typical loss of material during start-up of a machine, during which, inter alia, the various printing cylinders are brought in line with one another until they run synchronously, is also greatly reduced.

However, the very low viscosity of a common PVC paste and the size of a typical PVC molecule present practical problems with regard to digital printing of the PVC paste itself. It may be possible to provide technical solutions to these problems, but these make production of this paste significantly more expensive or delay the production process due to the fact that a relatively large amount of paste has to be laid relative to the print nozzle, of a typical industrial digital printhead. The production of wall covering with relief using digital printing with PVC paste is therefore more expensive than the traditional methods for producing wall covering with relief, in which this PVC paste is applied to a base using an analogue printing technique.

By now applying the expandable material itself by using an analogue printing technique and applying only liquids, which influence the expansion of this expandable material and which can be more readily printed digitally, by means of a digital printing technique, it is possible to take advantage of the abovementioned benefits of the application of a digital printing technique in order to produce a wall covering with relief, without significantly raising the costs of the production thereof.

In a preferred method according to the present invention, the heat-expandable material is a PVC paste.

In a first specific method according to the present invention, the main ingredient of the expandable material is PVC.

In a second specific method according to the present invention, the main ingredient of the expandable material is acrylic.

The digital printing technique which is used in a method according to the present invention is preferably an inkjet printing technique.

To this end, it is possible to use, for example, an inkjet printer, but in this case no ink is used, but rather said one or more liquids which influence the expansion of the expandable material, in printable form. Depending on the liquid to be applied, the print nozzles may be designed to be relatively wide or relatively narrow and the printheads may, for example, be made from materials which can withstand certain liquids.

The one or more liquids are more preferably sprayed onto the base by means of one or more printheads.

In a particularly preferred method according to the present invention, the one or more printheads are controlled piezo-electrically. A printhead with a piezoelectrical control unit may, within certain limits, be virtually liquid-independent, so that the same method and device can be used for several production processes with different liquids.

Nowadays, with the current controlled printheads, it is possible to determine not only whether liquid is or is not applied in a certain location, but also the amount of this liquid which is applied in this location. Thus, it is also possible to control the height of the relief to be produced in each location.

The one or more printheads which are used in a specific method according to the present invention preferably comprise several printheads which are fixedly arranged in series next to one another and/or in parallel rows.

By placing various digital printheads next to one another and, if desired, in several rows behind one another transversely to the feed direction of the base, it is possible to provide the desired relief on the base in a particularly quick manner.

In a particular method according to the present invention, the base is supplied in a continuous manner so that it advances with respect to one or more printheads.

In a more specific method according to the present invention, the one or more liquids also determine the colour.

Either before or after the application of the one or more relief-determining liquids, the base can also be provided with one or more finishing layers which may also have different thicknesses. These finishing layers may comprise, inter alia, vinyl (PVC, PVB, etc.), acrylic-containing substances, varnish, glue, PA, PES, colour, etc. It is also possible to apply liquids with additional properties, such as germicidal products or microorganism-killing products or fire-proof products, or products which provide high scratch resistance, or products which provide high resistance to wear, etc. in these additional layers and/or in the relief-determining liquids and/or separately.

These additional finishing layers and/or additional products may be applied by means of known methods, or may also be applied by means of a digital printing technique. Depending on the liquid to be applied, the print nozzles may be relatively wide or relatively narrow and the printheads may, for example, be made of materials which can withstand specific liquids.

The present invention will now be explained in more detail by means of the following detailed description of some preferred devices and methods according to the present invention. The sole aim of this description is to give illustrative examples and to indicate further advantages and particulars of these devices and methods, and can therefore not be interpreted as a limitation of the area of application of the invention or of the patent rights defined in the claims.

BRIEF DESCRIPTION OF THE DRAWINGS

Reference numerals are used in this detailed description to refer to the attached drawings, in which.

DETAILED DESCRIPTION OF THE INVENTION

The illustrated methods have been described by means of wallpaper. However, the present invention can also be used with wall coverings in general, including, for example, also reproductions with relief of works of art (such as for example reproductions of oil paintings, including the copied relief of the original paint mass of the original painting).

Figure 1:
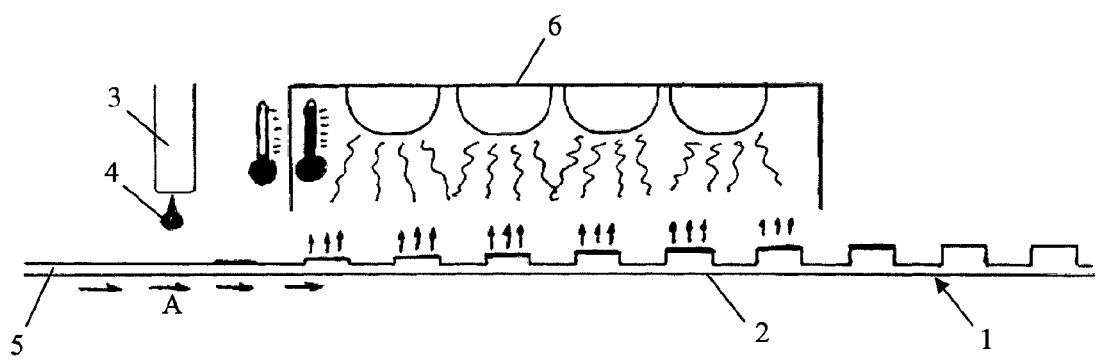
FIG. 1 diagrammatically shows in side view how wallpaper with relief can be obtained following digital printing of a liquid which promotes the expansion of an expandable material onto a base which is provided with a layer of expandable material, and following heating thereof.
Figure 2:
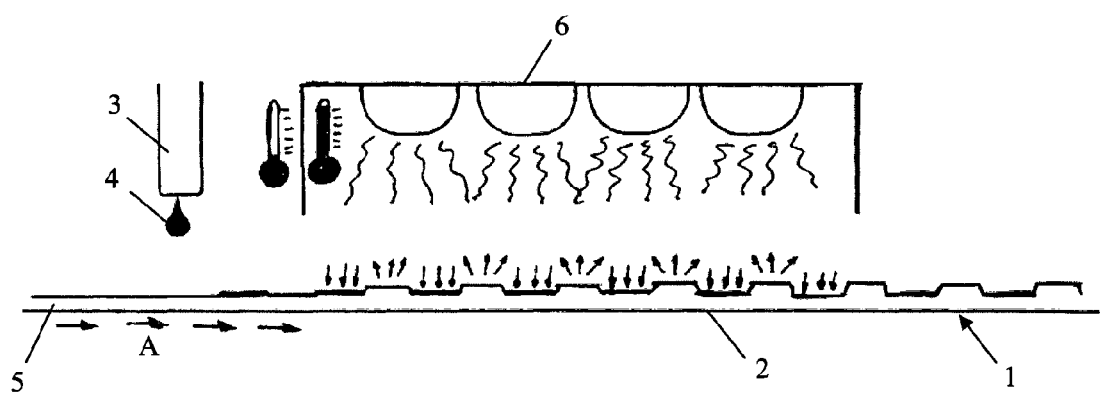
FIG. 2 diagrammatically shows in side view how wallpaper with relief can be obtained following digital printing of a liquid which prevents the expansion of an expandable material onto a base which is provided with a layer of expandable material, and following heating thereof.

FIGS. 1 and 2 in each case show how, by means of one or more printheads (3), liquid (4) which influences the expansion of an expandable material (5) can be applied to a base (2) which is provided with a layer of expandable material (5). This liquid (4) which influences the expansion of an expandable material (5) in this case at least partly determines the relief. Liquids (4) which may be used for this purpose may, for example, be liquids (4) known from the current production techniques for wallpaper.

PVC paste (5) is in each case applied to the base (2) as expandable material (5). This may be carried out, for example, in a known way by means of a screen-printing technique.

In each case, the base (2) with the PVC paste (5) which has been applied thereto is advanced with respect to the printheads (3) by means of feed means (not shown) in a feed direction (A). Feeding can in this case take place in a continuous manner. The printheads (3) may comprise one or more printheads (3) per device, in which case these printheads (3) can be moved either transversely to the feed direction (A) with respect to the base (2), or may be fixedly arranged in one or more rows next to one another, in which case these rows extend transversely to the feed direction (A) of the base (2). If the printheads (3) are fixedly arranged next to one another and possibly in several rows one behind the other, the wallpaper (1) can be provided with relief at a high speed and in a continuous manner.

In order to make the printheads (3) substantially liquid-independent, these (3) are preferably piezoelectrically actuable. In this case, these printheads are preferably actuated in such a manner that not only is it determined whether or not liquid is to be applied to the wallpaper (2), but also in which amount.

The device for applying relief to the wallpaper (1) in each case comprises heating means (6) for exposing the base (2) with the PVC paste (5) applied thereto and the liquids (4) applied thereto to heat. The same or analogue heating ovens (6) as used with the current devices for forming wallpaper according to the prior art can be used as heating means (6).

FIG. 1 shows how wallpaper (1) with relief can be produced by applying one or more liquids (4) which promote the expansion of the expandable material (5) to the base (2) which has been provided with a layer of PVC paste (5) using an analogue printing technique. The liquids (4) are "printed" in printable form by means of one or more printheads (3) onto the support (2) which passes below the printheads (3), with the control unit determining where and in which quantity these liquids (4) are to be applied. When the base (2) is passed underneath the heating oven (6), the PVC layer (5) will expand only or expand more in locations where these liquids (4) have been printed, until the desired relief has been formed.

Relief can also be provided by digitally "printing" liquids (4) in printable form in the same way onto wallpaper (2) which has been provided with a layer of expandable material (5), with these liquids (4) preventing or hindering the expansion of the expandable material (5), as is illustrated in FIG. 2. The layer of expandable material (5) which is, for example, a PVC layer (5) to which chemicals have been applied which cause the PVC to expand on account of the temperature, will in this case only expand completely in locations where no liquids (4) have been applied, and will only expand partly or not at all where the liquids (4) limit or prevent expansion.

Obviously, it is also possible to apply a combination of the above-described techniques in order to produce a desired relief on wallpaper (2).

The invention claimed is:

1. A method for producing a wall covering with relief, comprising:
   step a providing a base;
   step b applying a heat-expandable material to this base in a continuous process using an analogue printing technique;
   step c applying one or more liquids, which influence the expansion of the heat-expandable material, in a desired pattern in a continuous process directly onto the heat expandable material which has been applied to the base;
   step d heating the base with the heat-expandable material which has been applied thereto and the one or more liquids applied thereto to a temperature at which the heat-expandable material expands,
   wherein in step c, the one or more liquids are applied by means of a digital printing technique.

2. A method according to claim 1, wherein the heat-expandable material is a PVC paste.

3. A method according to claim 1, wherein the heat-expandable material comprises PVC as a main ingredient.

4. A method according to claim 1, wherein the heat-expandable material comprises acrylic as a main ingredient.

5. A method according to claim 1, wherein the digital printing technique is an inkjet printing technique.

6. A method according to claim 1, wherein the one or more liquids are sprayed onto the base by means of one or more printheads.

7. A method according to claim 6, wherein the one or more printheads are controlled piezoelectrically.

8. A method according to claim 6, wherein the one or more printheads comprise several printheads which are fixedly arranged in series next to one another and/or in parallel rows.

9. A method according to claim 6, wherein the base is supplied in a continuous manner so that it advances with respect to the one or more printheads.

10. A method according to claim 1, wherein the one or more liquids determine a color.

11. A method according to claim 1, wherein said wall covering is wallpaper.

* * * * *

UNITED STATES PATENT AND TRADEMARK OFFICE
CERTIFICATE OF CORRECTION

| | | |
|---|---|---|
| PATENT NO. | : 9,044,966 B2 | Page 1 of 1 |
| APPLICATION NO. | : 14/008662 | |
| DATED | : June 2, 2015 | |
| INVENTOR(S) | : Van Den Steen | |

It is certified that error appears in the above-identified patent and that said Letters Patent is hereby corrected as shown below:

On the title page item [73] delete "LIMITD" insert --LIMITED--

Signed and Sealed this
Fifth Day of April, 2016

Michelle K. Lee
*Director of the United States Patent and Trademark Office*